(12) United States Patent
Psaltis et al.

(10) Patent No.: US 7,158,228 B2
(45) Date of Patent: Jan. 2, 2007

(54) HOLOGRAPHIC IMAGING SPECTROMETER

(75) Inventors: Demetri Psaltis, Pasadena, CA (US); Wenhai Liu, Alhambra, CA (US); Jose Mumbru, Barcelona (ES); George Barbastathis, Boston, MA (US)

(73) Assignees: California Institute of Technology, Pasadena, CA (US); Massachusetts Institute of Technology, Cambridge, MA (US)

( * ) Notice: Subject to any disclaimer, the term of this patent is extended or adjusted under 35 U.S.C. 154(b) by 461 days.

(21) Appl. No.: 10/627,184

(22) Filed: Jul. 25, 2003

(65) Prior Publication Data

US 2004/0021871 A1    Feb. 5, 2004

Related U.S. Application Data

(60) Provisional application No. 60/398,945, filed on Jul. 25, 2002.

(51) Int. Cl.
*G01J 3/12*     (2006.01)
*G01J 3/18*     (2006.01)
(52) U.S. Cl. .................................. 356/326; 356/328
(58) Field of Classification Search ................ 356/326, 356/328, 334; 359/15
See application file for complete search history.

(56) References Cited

U.S. PATENT DOCUMENTS 3,013,467 A     12/1961 Minsky
4,386,414 A  *   5/1983 Case ........................... 359/15
4,752,130 A  *   6/1988 George et al. ............... 356/334

OTHER PUBLICATIONS

Liu et al, Volume Holographic Spatial and Spectral Imaging, IEEE LEOS Newsletter, vol. 15, No. 4, Aug. 2001, pp. 8-10.*
Lui et al, Real-time spectral imaging in three spatial dimensions, Optics Letters, vol. 27, No. 10, May 15, 2002, pp. 854-856.*
Lui et al, Real-time hyperspectral imaging with volume holographic optical elements, IEEE Proceedings, 2001 International Conference on Image Processing, vol. 2, Oct. 2001, pp. 1049-1052.*
G. Barbastathis et al., "Shift-Multiplexed Holographic Memory Using The Two-Lambda Method," Mar. 15, 1996, Optics Letters, 21(6):432-434.
G. Barbastathis et al., "Confocal Microscopy With A Volume Holographic Filter," Jun. 15, 1999, Optics Letters, 24(12):811-813.
G. Barbastathis et al., "Multidimensional Tomographic Imaging Using Volume Holography," Dec. 1999, Proceedings of the IEEE; 87(12):2098-2120.
G. Barbastathis et al., "Shift Multiplexing With Spherical Reference Waves," May 10, 1996, App. Opt. 35(14):2403-2417.

(Continued)

*Primary Examiner*—F. L. Evans
(74) *Attorney, Agent, or Firm*—Gates & Cooper LLP

(57) ABSTRACT

A holographic imaging spectrometer, apparatus, and/or method enables the projection of a two-dimensional (2D) slice (having spectral information) of a four-dimensional (4D) probing object. A 4D probing source object is illuminated to emit an optical field. A holographic element having one or more recorded holograms receives and diffracts the optical field into a diffracted plane beam having spectral information. Collector optics (e.g., an imaging lens) focuses the diffracted plane beam having spectral information to a 2D slice (having spectral information) of the 4D probing source object. The focused 2D slice having spectral information is projected onto a 2D detector array surface. In addition, the holographic element may have multiple multiplexed holograms that are arranged to diffract light from the corresponding slice of the 4D probing source object to a non-overlapping section of the detector.

30 Claims, 12 Drawing Sheets

OTHER PUBLICATIONS

G.W. Burr et al., "Effect Of The Oxidation State Of $LiNbO_3$:Fe On The Diffraction Efficiency Of Multiple Holograms," Jun. 15, 1996, Optics Letters, 21(12):893-895.

W.H. Carter et al., "Correlation Theory of Wavefields Generated By Fluctuating, Three-Dimensional, Primary, Scalar Sources," 1981, Optica Acta, 28(2):227-244.

J-J.P. Drolet et al., "Compact, Integrated Dynamic Holographic Memory With Refreshed Holograms," Apr. 15, 1997, Optics Letters, 22(8):552-554.

D. Huang et al., "Optical Coherence Tomography," Nov. 22, 1991, Science, New Series, 254(5035):1178-1181.

K. Itoh et al., "Fourier-Transform Spectral Imaging: Retrieval Of Source Information From Three-Dimensional Spatial Coherence," Jan. 1986; J. Opt. Soc. Am.A/ 3(1):94-100.

H. Lee, "Volume Holographic Interconnections With Maximal Capacity And Minimal Cross Talk," Mar. 15, 1989, J. Appl. Phys. 65(6):2191-2194.

W. Liu et al., "Pixel Size Limit In Holographic Memories," Oct. 1, 1999, Optics Letters, 24(19):1340-1342.

Daniel L. Marks et al., "Visible Cone-Beam Tomography With A Lensless Interferometric Camera," Jun. 25, 1999, Science, 284:2164-2166.

U. Morgner et al., "Spectroscopic Optical Coherence Tomography," Jan. 15, 2000, Optics Letters, 25(2):111-113.

Demetri Psaltis et al., "Nonvolatile Storage In Photorefractive Crystals," Feb. 1, 1994, Optics Letters, 29(3):210-212.

J. Rosen et al., "General Theorem of Spatial Coherence Application To Three-Dimensional Imaging," Oct. 1996, J. Opt. Soc. Am. A, 13(10):2091-2095.

G.G. Yang et al., "Volume Reflection Holographic Confocal Imaging," Aug. 10, 2000, Appl. Opt., 39(23):4076-4079.

H. Zhou et al., "Angle-Dependent Diffraction Efficiency In A Thick Photorefractive Hologram," Mar. 10, 1995, Applied Optics, 34(8):1303-1309.

* cited by examiner

HOLOGRAPHIC IMAGING SPECTROMETER

CROSS-REFERENCE TO RELATED APPLICATIONS

This application claims the benefit under 35 U.S.C. Section 119(e) of the following and commonly-assigned U.S. provisional patent application(s), which is/are incorporated by reference herein:

Provisional Application Ser. No. 60/398,945, filed on Jul. 25, 2002, by Demetri Psaltis, Wenhai Liu, Jose Mumbru, and George Barbastathis, entitled "HOLOGRAPHIC IMAGING SPECTROMETER."

STATEMENT REGARDING FEDERALLY SPONSORED RESEARCH AND DEVELOPMENT

The invention was made with Government support under Grant No.F30601-98-1-0199 awarded by DARPA, and Grant No. EEC9402726 awarded by the National Science Foundation. The Government has certain rights in this invention.

BACKGROUND OF THE INVENTION

1. Field of the Invention

The present invention relates generally to volume holography, and in particular, to a volume-holographic optical imaging instrument having the capability to return three-dimensional spatial as well as spectral information.

2. Description of the Related Art

Classical imaging systems process optical fields by using elements such as lenses, apertures and stops, and thin diffraction gratings. By placing several such elements in tandem, projections of very general objects (e.g., containing three-dimensional (3D) spatial as well as spectral information) may be captured. Such general objects are referred to as four dimensional (4D) objects. The projections of the 4D objects by the imaging system are two-dimensional (2D) or lower. Accordingly, to span the entire 3D or 4D space, scanning is needed. However, such scanning is a very time consuming process. Alternatively, instead of (or in combination with) scanning, various other prior art methods may be utilized (e.g., coherence imaging). However, such alternative methods may have a limited dynamic range or other disadvantages. To better understand these disadvantages, a description of prior art volume holography, imaging systems, and scanning mechanisms is useful.

Volume holography has been predominantly considered as a high-density data storage technology. With volume holography, the volume of the recording medium is utilized for storage instead of only utilizing the surface area (such as with compact discs [CDs] and/or digital video discs [DVDs]). Traditionally, when a laser is fired, a beam splitter is utilized to create two beams. One beam, referred to as the object or signal beam/wavefront travels through a spatial light modulator (SLM) that shows pages of raw binary data as clear and dark boxes. The information from the page of binary code is carried by the signal beam to a light-sensitive lithium-niobate crystal (or any other holographic materials such as a photopolymer in place of the crystal). The second beam (produced by the beam splitter), called the reference beam, proceeds through a separate path to the crystal. When the two beams meet, the interference pattern that is created stores the data carried by the signal beam in a specific area in the crystal as a hologram (also referred to as a holographic grating).

Depending on the angle of the reference beam used to store the data, various pages of data may be stored in the same area of the crystal. To retrieve data stored in the crystal, the reference beam is projected into the crystal at exactly the same angle at which it entered to store that page of data. If the reference beam is not projected at exactly the same angle, the page retrieval may fail. The beam is diffracted by the crystal thereby allowing the recreation of the page that was stored at the particular location. The recreated page may then be projected onto a charge-coupled device (e.g., CCD camera), that may interpret and forward the data to a computer.

Thus, as described above, a complex data-encoded signal wavefront is recorded inside a media as sophisticated holographic gratings by interference with a selective coherent reference beam. The signal wavefront is recovered later by reading out with the same corresponding reference beam.

Bragg's law determines that the diffracted light intensity is significant only when the diffracted light is spatially coherent and constructively in phase. Bragg's law is often used to explain the interference pattern of beams scattered by crystals. Due to the highly spatial and wavelength Bragg selectivity of a crystal, a large number of holograms can be stored and read out selectively in the same volume. Accordingly, there is a potential for one bit per wavelength cube data storage volume density and intrinsic parallelism of data accessing up to Mbytes per hologram.

The above-described properties also make a volume hologram a powerful tool for optical information processing. For example, a complex signal wavefront may be extracted and processed by one or multiple holograms as a color and spatial filter in confocal microscopes (see e.g., G. Barbastathis, M. Balberg, and D. J. Brady, "Confocal microscopy with a volume holographic filter," Opt. Lett., vol. 24, no. 12, pp. 811–813, 1999 [which is incorporated by reference herein]). In another example, an element may be directly imaged for 3-D spatial and color information (see e.g., G. Barbastathis and D. J. Brady, "Multidimentional tomographic imaging using volume holography," Proc. IEEE, vol. 87, no. 12, pp. 2098–2120, 1999; and G. G. Yang, H. S. Chen, and E. N. Leith, "Volume reflection holographic confocal imaging," Appl. Opt., vol. 39, no. 23, pp. 4076–4079, 2000 [which articles are incorporated by reference herein]).

Optical information processing may be different from a data storage application where information is recorded inside the medium as complex holographic gratings. For imaging applications, simple pre-designed strong volume holograms may be recorded to process information from unknown complex incident wavefronts. The extremely spatial and color selectivity of Bragg matching in volume holograms makes it possible to selectively extract specific information from the input, and project them into one or multiple detectors.

As described above, prior art methods require scanning to span the entire 3D or 4D space. However, there are many limitations to such scanning.

A classical confocal microscope may be used to scan the 3D or 4D space. Confocal microscopes and their use are more fully illustrated in M. Minsky, "Microscopy apparatus," U.S. Pat. No. 3,013,467 (Dec. 19, 1961); T. Wilson, Con focal Microscopy (Academic, San Diego, Calif., 1990); and J. K. Stevens, L. R. Mills, and J. E. Trogadis, eds., Three-Dimensional Confocasl Microscopy: Volume Investigation of Biological Systems (Academic, San Diego, Calif., 1994), which are incorporated by reference herein. Confocal microscopes may use a combination of objective-collector lenses and a pinhole to capture information about a single point in the object and acquires a zero-dimensional projection at every measurement. Scanning along three dimensions is needed to acquire the 3D spatial structure of the object. By providing spectral scanning means (e.g., a monochromator or a scanning Fabry-Perot interferometer), one can also acquire spectral information. However, such scanning is a very time-consuming procedure.

Another method for capturing spatial information is that of optical coherence tomography which only requires 3D scanning (see e.g., D. Huang, E. A. Swanson, C. P. Lin, J. S. Schuman, W. G. Stinson, W. Chang, M. R. Hen, T. Flotte, K. Gregory, C. A. Puliafito, and J. G. Fujimoto, Science 254, 1178 (1991), which is incorporated by reference herein). In such optical coherence tomography, spectral information may be recovered digitally from the phase of the correlation function of the optical beam (see e.g., U. Morgner, W. Drexler, F. X. Kartner, X. D. Li, C. Pitris, E. P. Ippen, and J. G. Fujimoto, Opt. Lett. 25, 111 (2000) which is incorporated by reference herein).

Coherence imaging may also be used. However, coherence imaging returns 2D projections in the Fourier (k) space at the expense of dynamic range (see e.g., W. H. Carter and E. Wolf, Opt. Acts 28, 227 (1981); K. Itoh and Y. Ohtsuka, J. Opt. Soc. Am. A 3, 94 (1986); J. Rosen and A. Yariv, J. Opt. Soc. Am. A 13, 2091 (1996); and D. L. Marks, R. A. Stack, D. J. Brady, D. C. Munson, Jr., and R. B. Brady, Science 284, 2164 (1999), which are incorporated by reference herein).

Accordingly, as described above, the prior art fails to provide a method, apparatus, or article of manufacture with the capability to quickly acquire spatial and spectral information simultaneously (in a single measurement). Such a failure forces 3D and 4D imaging to be dependent on the scanning speed of the mechanism used.

SUMMARY OF THE INVENTION

Classical imaging system process optical fields using elements such as lenses, apertures and stops, and thin diffraction gratings. However, such prior art imaging systems fail to simultaneously form projections of very general objects that comprise both three-dimensional spatial as well as spectral information.

The present invention provides the capability to form projections of such objects (referred to as four-dimensional [4D] objects). Initially, a holographic element is prerecorded with one or more holograms. A spectrometer of the invention then utilizes the holographic element to form the projections. The optical field emitted or scattered by a 4D object is transformed/processed/collimated using objective optics (e.g., a collimating lens). The processed field is then diffracted by the holographic element. Each hologram within the holographic element is tuned to its corresponding two-dimensional (2D) slice (and spectral information) of the 4D object. Accordingly, collector optics (e.g., an imaging lens) are able to receive the diffracted field from the holographic element to project the 2D slice (and spectral information) onto a detector.

To capture all of the 2D slices of the 4D object, multiple holograms may be multiplexed within the holographic element. The holograms are arranged in such a manner to extract a corresponding 2D slice of the 4D object and diffract the slice to a non-overlapping section of the detector. In this manner, the entire 4D object space may be projected without the need for time-consuming scanning of each slice (or the use of multiple detectors).

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

One or more embodiments of the invention provide a volume-holographic optical imaging instrument with the capability to return three-dimensional spatial as well as spectral information about semitranslucent microscopic objects in a single measurement.

Four-Dimensional Volume Holographic Microscope

With multiple holograms within the same volume, a single holographic image element may be used to distinguish image information from different locations and different wavelengths. Such an element may provide multidimensional information without a scanning mechanism. Therefore, real time 4D imaging becomes possible at rates specified by the photon count and not the scanning speed. The present invention provides a volume holographic imaging instrument with the capability to acquire spatial and spectral information simultaneously (in a single measurement).

The 4D imaging capability of a volume hologram is based on the Bragg diffraction and degeneracy properties of volume holograms. Such 4D capabilities are further illustrated in G. Barbastathis and D. Psaltis, Opt. Lett. 21, 429 (1996); G. Barbastathis, M. Balberg, and D. J. Brady, Opt. Lett. 24, 811 (1999); and G. Barbastathis and D. J. Brady, Proc. IEEE 87, 2098 (1999), which are incorporated by reference herein. As described herein, Bragg degeneracy properties refers to Bragg matching with a probing source that is different from the recording source (see detailed description below).

Figure 1:
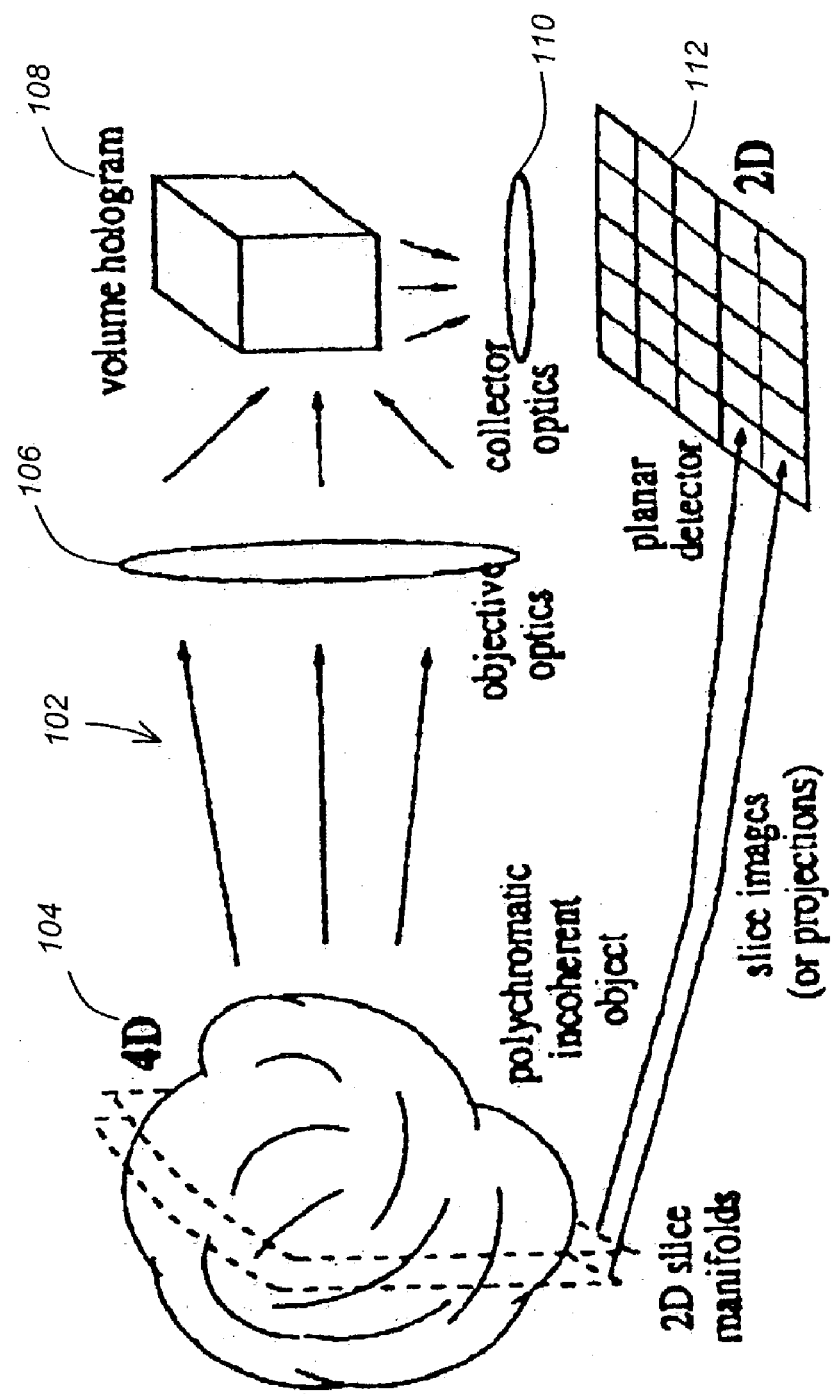
FIG. 1 illustrates a principle of volume-holographic imaging in accordance with one or more embodiments of the invention.

The principle of volume-holographic imaging is illustrated in FIG. 1. The optical field 102 emitted or scattered by a 4D object 104 (e.g., a polychromatic incoherent object) is transformed by the appropriate combination of lenses/objective optics 106 and subsequently diffracted by a volume-holographic optical element 108, which has been prerecorded with multiple superimposed holograms. Each hologram is tuned (e.g., using collector optics 110) to its corresponding 2D slice 112 of the 4D object 104. If the projected slices 112 span the entire 4D object 104 space, then the need for scanning is eliminated.

Figure 2A:
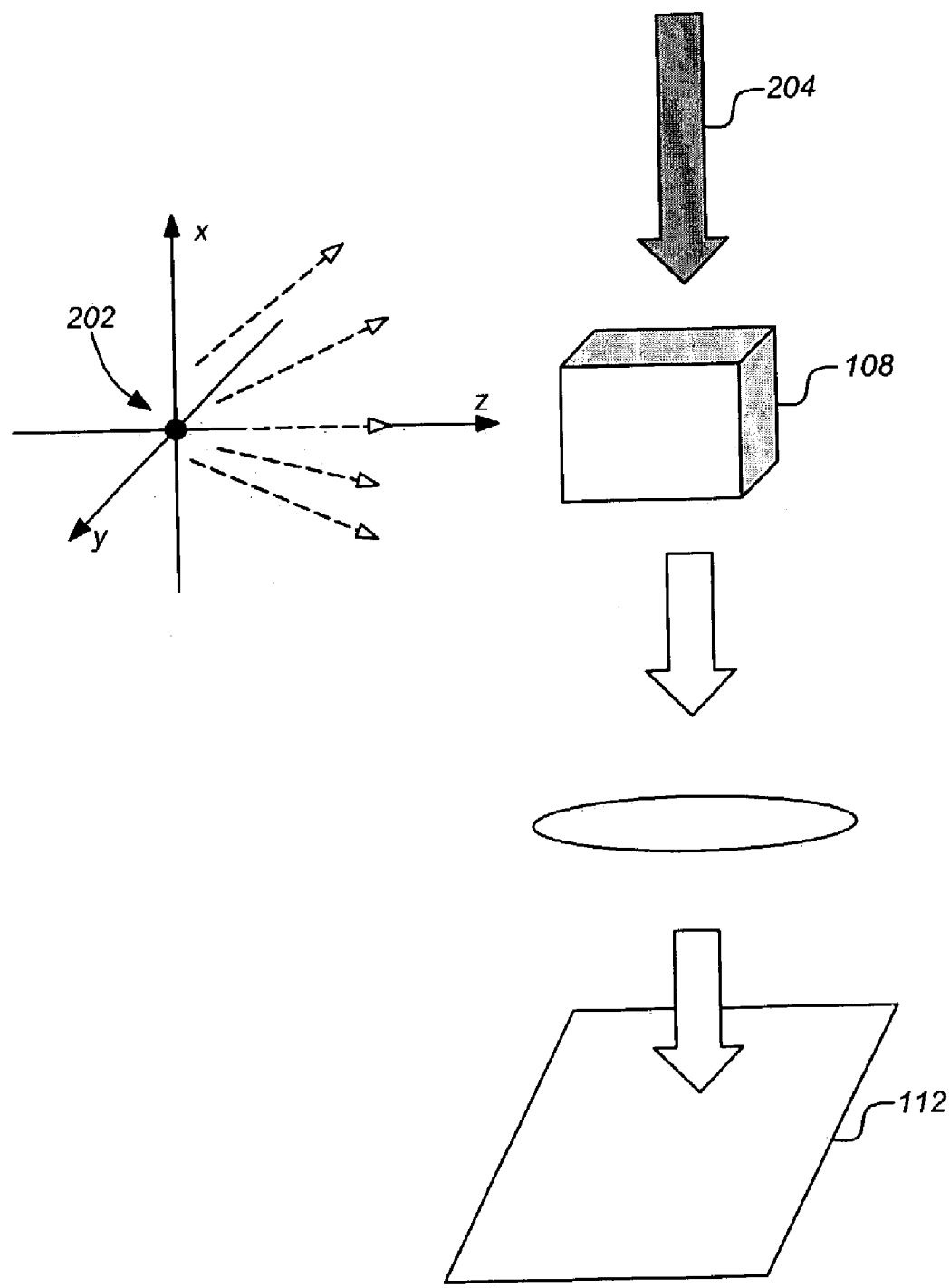
FIGS. 2A–2C further illustrate the principles of a volume holographic imaging system in accordance with one or more embodiments of the invention.
Figure 2B:
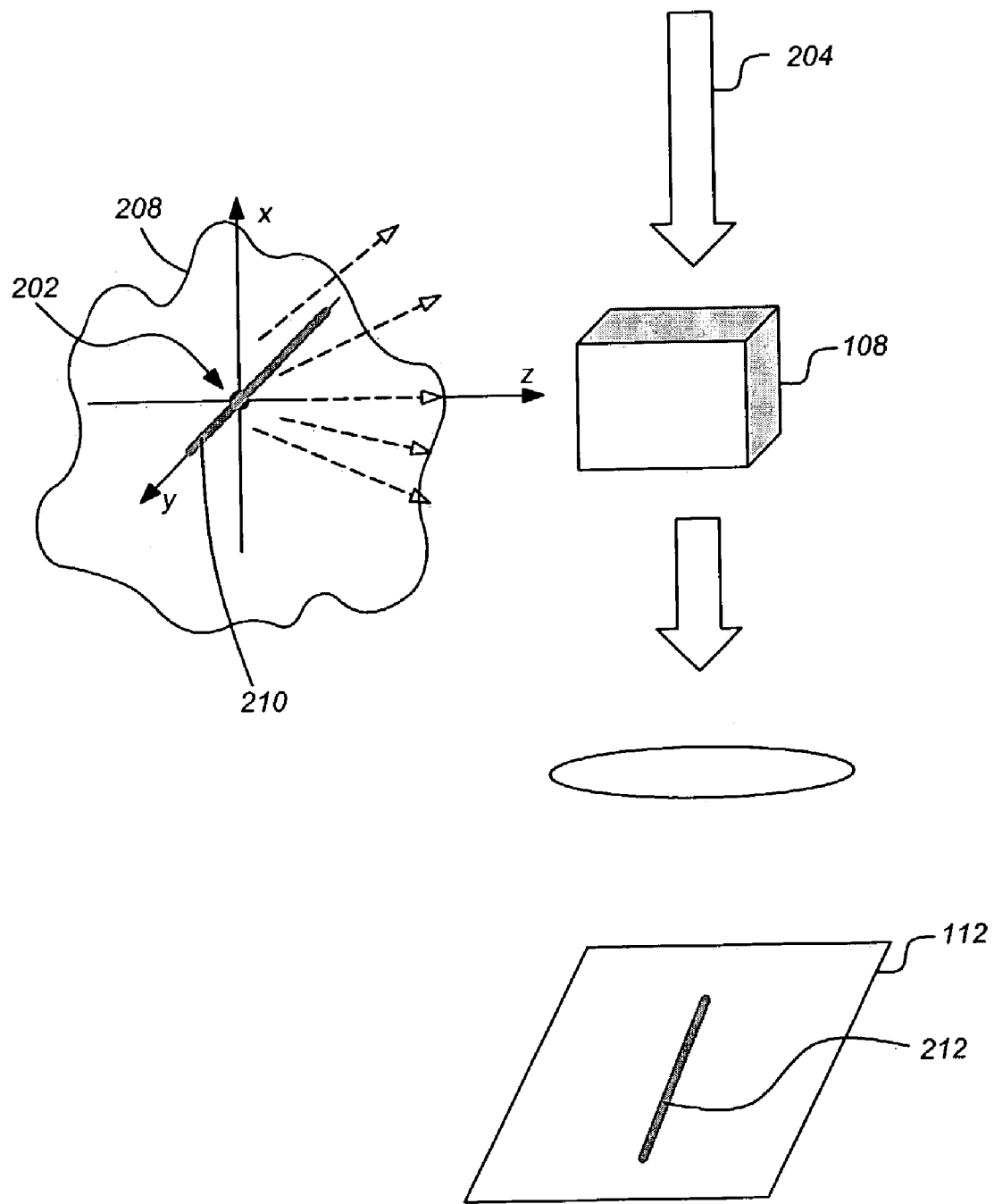
Figure 2C:
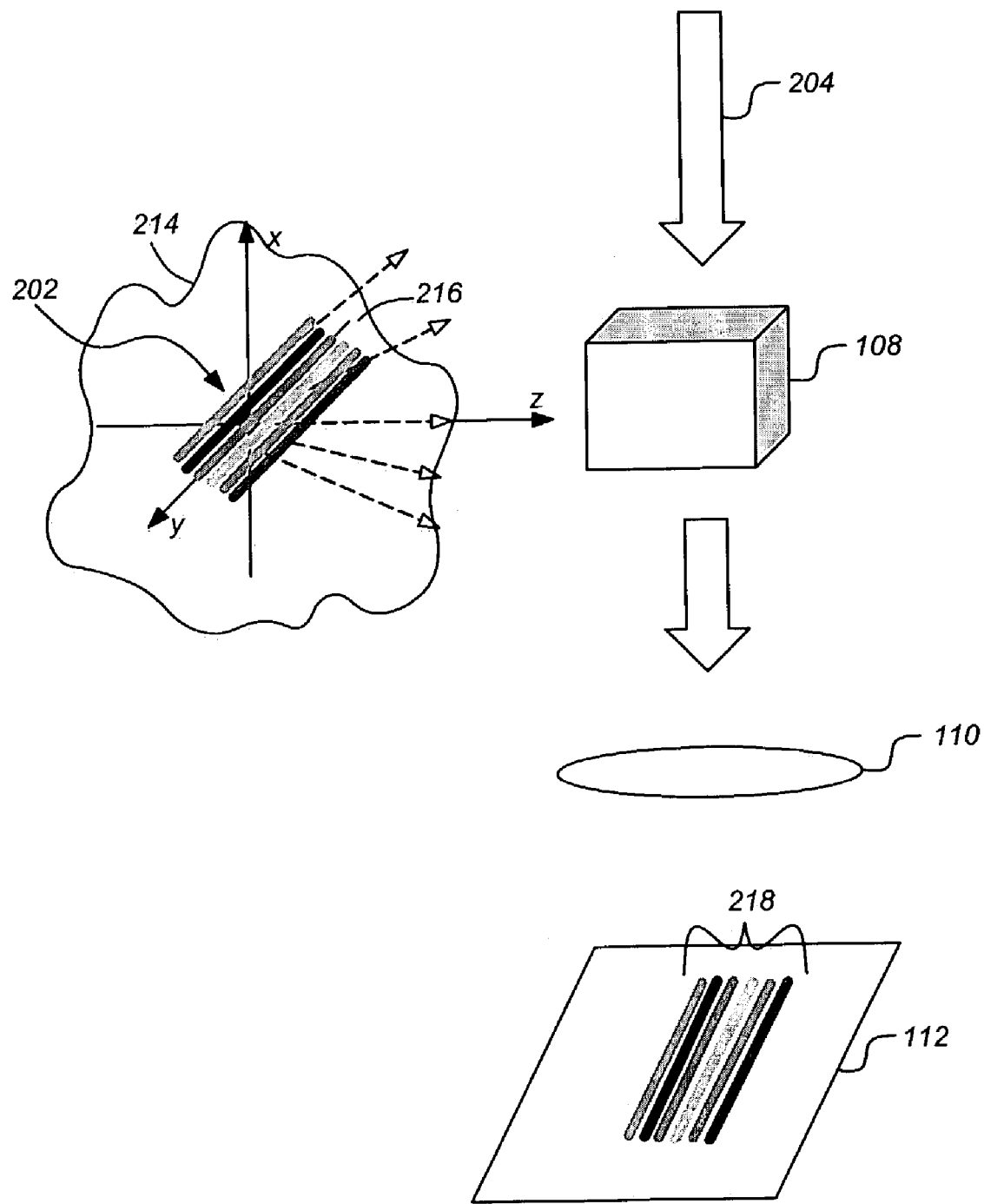

The 4D imaging sensor provided by the invention is a specifically designed volume holographic element (e.g., volume hologram 108) which acts as the principal imaging device, complemented with auxiliary optics and a planar opto-electronic detector. FIGS. 2A–2C further illustrate the principles of the system in accordance with one or more embodiments of the invention.

A simple volume hologram 108 is recorded by a signal point source 202 and a plane wave reference beam 204, in FIG. 2A. Information about the location and wavelength of the point source 202 is recorded in the orientation and spacing of the 3D interference fringes within the volume hologram 108.

Once recorded, the information recorded in the volume hologram 108 may be retrieved/reconstructed. While traditional holographic applications utilize a reference beam 204 to retrieve signal information (as described above), the present invention provides the capability to retrieve the planar reference beam 204. In this regard, a probe point source may be utilized to retrieve the information. First, suppose that the volume hologram 108 is probed by a probe point source identical to the recording point source 202 in both location and wavelength. The probing field will perfectly match the 3D fringes and will produce a strong diffracted plane wave, i.e., it will be Bragg-matched. A point receiver/detector 112 placed in the image plane of the recording signal beam 202 will record a maximum intensity of the reference beam 204.

However, if the probe source is displaced with respect to the recording point source 202 but at the same wavelength, then in general the probe field does not perfectly match the 3D fringes, and the diffracted field vanishes. An exception occurs along the out-of-plane y direction, along which the fringes are invariant. Therefore (referring now to FIG. 2B), if the probe source is an object 208 extended around the location of the original recording source 202 but at the same wavelength, the only portion of the probe source object 208 that will produce significant diffraction is a thin line 210 oriented along the y-axis. That Bragg-matched portion of the probe source object 208 will form a line image 212 on a detector 112 at the Fourier plane of the reference beam 204, which acts as the image plane of the signal beam 202. The remaining portion of the extended probe 208 passes through the hologram 108 without diffracting in the direction of the signal beam 202, as shown in FIG. 2B.

Referring to FIG. 2C, suppose that the volume hologram 108 is probed with an extended source object 214, which is also chromatic. In addition to the degenerate y-direction described above at the point source 202 wavelength, the 3D interference fringes may be matched by portions of the probe source 214 that are simultaneously at a different wavelength and spatially displaced relative to the point source 202. Matching occurs when the combined wavelength-spatial change results in identical 3D interference fringes with the signal. Each wavelength-spatial matched portion extends along a degenerate y line, together forming a slice 216 across the probe 214. Accordingly, after processing through volume hologram 108 and collector optics 110, the Bragg matched portion of the probe source 214 will form a slice on the detector 112 at the Fourier plane of the reference beam 204.

The Bragg degenerate matching slice 218 and the spatial/wavelength shift selectivity leads to the optical sectioning ability by a single volume hologram 108 across the 4D hyper-objective space (3D spatial dimensions plus spectral dimension). Shift selectivity is more fully described in G. Barbastathis, M. Levene, and D. Psaltis, "Shift multiplexing with spherical reference waves," Appl. Opt. 35 (1996), 2403–2417; and G. Barbastathis and D. Psaltis, "Shift-multiplexed holographic memory using the two-lambda method," Opt. Lett. 21 (1996), no. 6, 429–431, which are incorporated by reference herein.

Figure 3A:
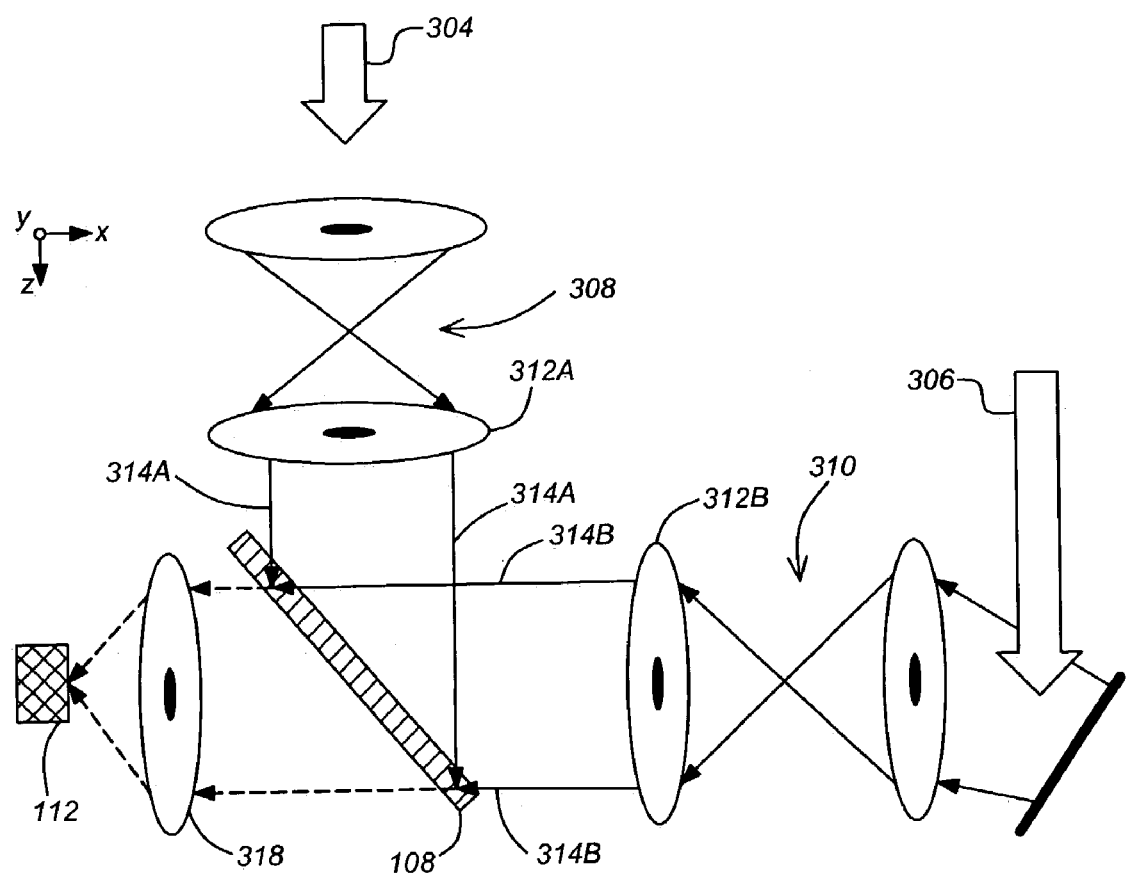
FIGS. 3A and 3B illustrate an example of a simple transmission geometry that may be used in a transformation in accordance with one or more embodiments of the invention.
Figure 3B:
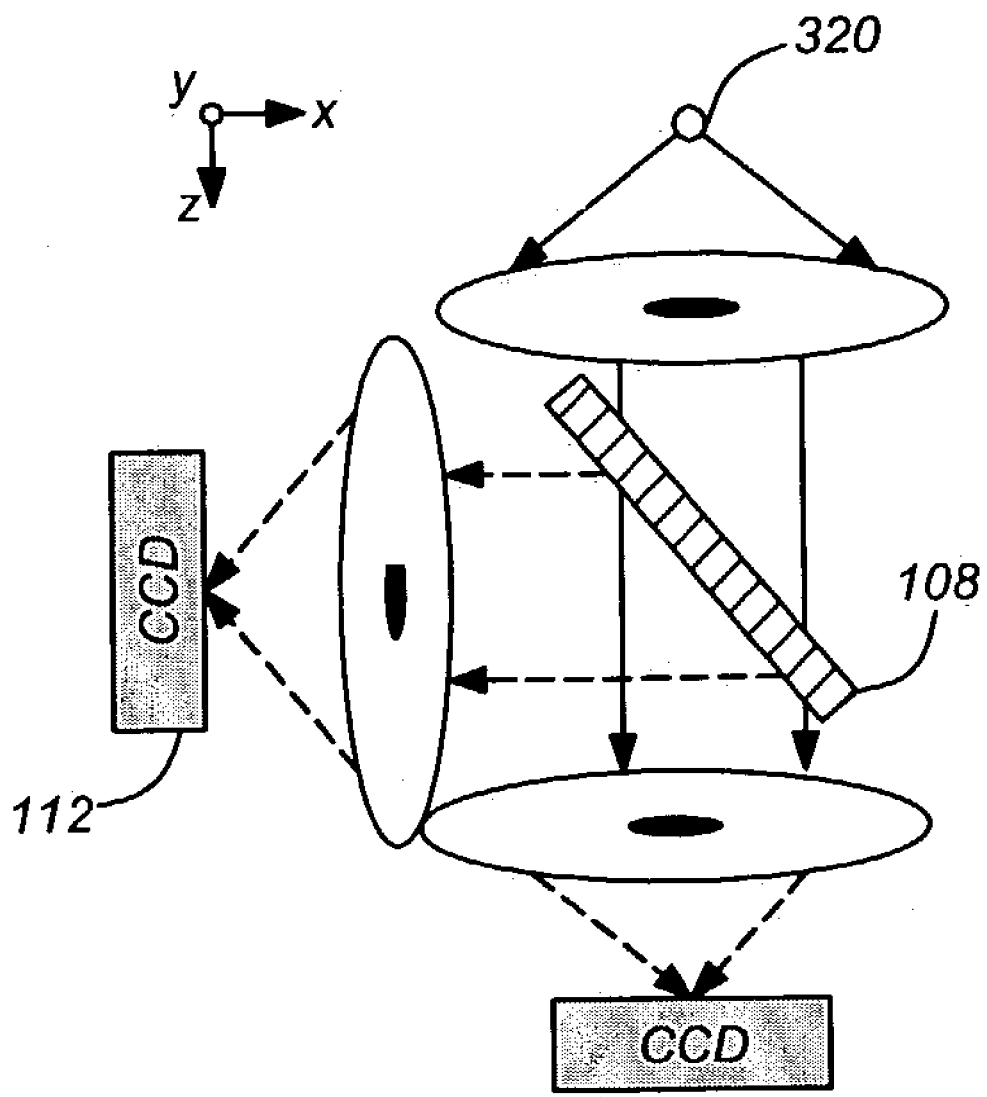

With an appropriate geometry, a volume hologram 108 may be used to transform the optical section information linearly onto a 2D detector surface 112 as an image system. FIGS. 3A and 3B illustrate an example of a simple transmission geometry that may be used in such a transformation. In FIG. 3A, a simple transmission hologram 108 is recorded with collimated beams (parallel rays of light) from a signal point source 308 (generated by a focused beam 304) and a plane wave reference beam 306. The recording signal 308 and reference beams 310 are then processed through collimating lenses 312A and 312B respectively to produce collimating beams 314A and 314B. The created interference pattern of the collimating beams 314A and 314B is recorded in the volume hologram 108.

This single volume hologram 108 has the power to extract a 2-D slice color-filtered image (e.g., onto detector 112 using imaging lens 318) due to the spatial and wavelength degeneracies of the volume hologram 108. Referring to FIGS. 3A and 3B, during imaging (i.e. retrieval), the probe object 320 is placed at the recording point source 308 location. When the volume hologram 108 is readout with the same point source 320 at the recording wavelength, the diffracted reference beam 306 will be focused and project a point image on the detector/photo sensor 112 (also referred to as a charge coupled device [CCD] camera).

Figure 4:
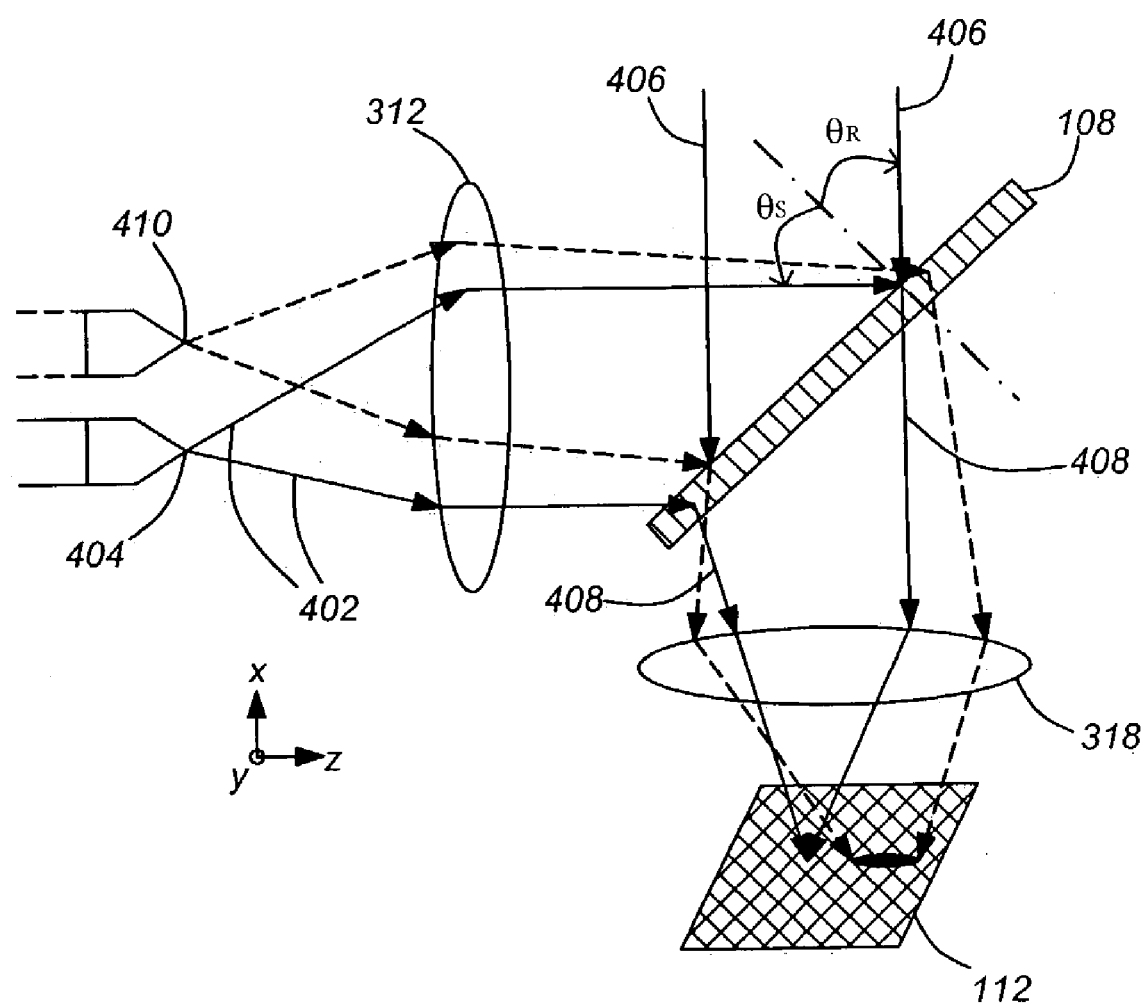
FIG. 4 illustrates a detailed structure for a specific holographic imaging of a transmission geometry in accordance with one or more embodiments of the invention.

FIG. 4 further illustrates a detailed structure for a specific holographic imaging of a transmission geometry in accordance with one or more embodiments of the invention. The signal beam 402 is collimated (e.g., through collimating lens 312) from a monochromatic coherent recording point source 404 at $(x_r, y_r, z_r, \lambda_r)$. The volume hologram 108 is recorded by interfering the collimated signal beam 402 with its coherent plane reference beam 406 (e.g., in the –x direction).

Once recorded in the volume hologram 108, the recorded information may be retrieved/reconstructed. In this regard, imaging lens 318 may focus the diffracted beam 408 from the volume holographic optical element 108 onto a 2D detector array surface 112. The 2D detector array surface 112 may then forward the digital information to a computer, for example.

The following description illustrates the effect of probing of the volume hologram 108 while taking advantage of the Bragg diffraction selectivity and degeneracy properties of volume holograms 108. For simplicity, a simple probe point source object 410 with an arbitrary wavelength $\lambda_p$, located in the vicinity of the recording point source 404 (e.g., $(x_p, y_p, z_p, \lambda_p)$) is described herein. However, it should be noted that alternative and more complex point source objects 410 may be utilized in accordance with the invention.

When the probe 410 is displaced in the x-direction (e.g., $\Delta x_p(|\Delta_p| \ll f_c|)$) the collimated signal beam rotates in the xz-plane. According to known angle selectivity, the diffraction efficiency, $\eta(\Delta x_p) = \text{sinc}^2(\Delta x_p/f_c\Delta\theta_s)$, drops to zero (the first null) at $\Delta\theta_s$:

$$\Delta\theta_S = \frac{|\Delta x_p|}{f_c} = \frac{\lambda}{D} \frac{1}{\cos\theta_S(\tan\theta_{Sn} + \tan\theta_{Rn})},$$

where D is the thickness of the hologram, $f_c$ is the focal length of collimating/objective lens, and $\theta_{Sn}$, $\theta_{Rn}$, and $\theta_S$ are the incident angles inside or outside the holographic material 108. If instead, the probe point source 410 is displaced relative to the recording point source 404 by $\Delta Z_p$ in depth, the light after the collimator lens 312 is a spherical wave. The diffraction efficiency can be approximated to first order by incoherent addition of all spatial frequency components of the defocused beam in the xz-plane as:

$$\eta(\Delta z_p) = \frac{1}{\alpha}\int_0^\alpha \text{sinc}^2\left(\frac{t}{\Delta\theta_s}\right)dt$$

where, $\alpha = L\Delta z_p/2f_c^2$, and L is the collimating lens 312 aperture. G. Barbastathis and D. Psaltis, Opt. Lett. 21, 429 (1996) (which is incorporated by reference herein) provides further details regarding such addition. Finally, for a small probe 410 wavelength deviation $|\Delta\lambda_p| \equiv |\lambda_p - \lambda_r| \ll \lambda_r$, the diffraction efficiency drops, to first order, as $\eta(\Delta\lambda_p) = \text{sinc}^2(\Delta\lambda_p/\lambda_r\Delta\beta)$, where:

$$\Delta\beta = \frac{\lambda_r}{nD}\frac{\cos\theta_{Rn}}{1-\cos(\theta_{Sn}+\theta_{Rn})}.$$

Figure 5A:
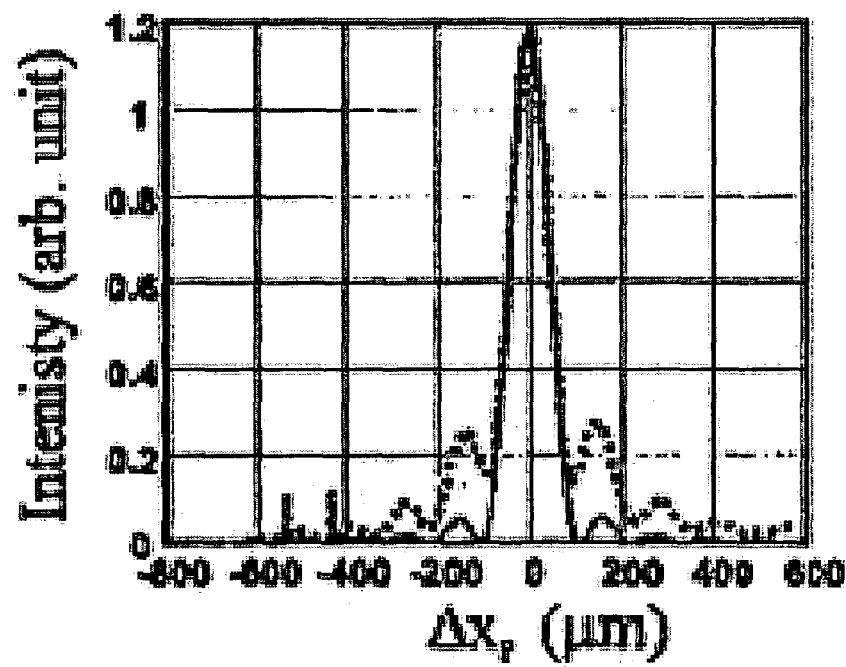
FIGS. 5A and 5B illustrate and provide a comparison of experimental and theoretical spatial selectivities while displacing a probe in accordance with one or more embodiments of the invention.
Figure 5B:
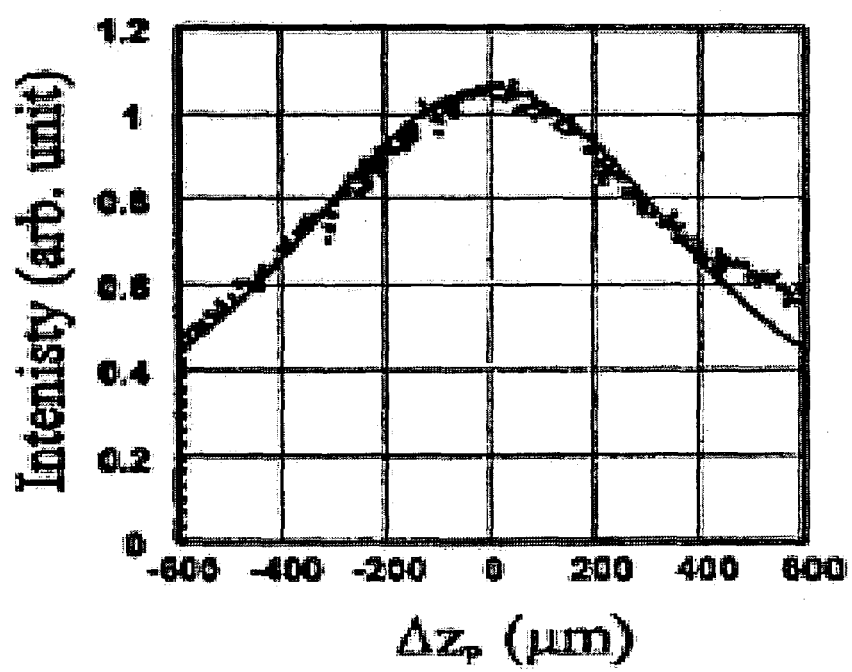

FIGS. 5A and 5B illustrate and provide a comparison of experimental and theoretical spatial selectivities while displacing a probe 410 in the x-direction (FIG. 5A) and in the z-direction (FIG. 5B). The diffraction efficiency of the theoretical calculations are illustrated as solid curves, while experimental measurements are illustrated as dotted curves. As illustrated in FIG. 5A, as the volume hologram 108 is probed by a point source 410 displaced along the x-direction at the same wavelength, the collimated signal beam rotates relative to the collimated recording beam 402 in the xz-plane providing varying intensity values with null values at various x-values. As illustrated in FIG. 5B, as the volume hologram 108 is probed by a point source 410 displaced along the z-direction in depth, the light (i.e., measured intensity) is a spherical wave.

The experimental data was obtained using a volume hologram 108 that was recorded and probed with an Ar+ laser at 488 nm, with a 10×, 0.25-N.A. objective lens as the collimating lens 312, in holographic Dupont HRF-150 photopolymer (D=100 µm, n≈1.5), leading to a resolution of $\Delta x_p$ 104 µm (first null) and $\Delta z_p$=400 µm (FWHM-full width half maximum). As illustrated, the theoretical (solid curves) and experimental data (dotted curves) are in good agreement. These diffraction efficiencies provide an imaging resolution on $\Delta x_p$, $\Delta z_p$, and $\Delta\lambda_p$, which are determined by the volume hologram 108 thickness, D, and the objective lens, $f_c$.

Two basic Bragg degeneracies (i.e., Bragg matching with a probing source 410 that is different from the recording source [see H. Lee, X. -G. Gu, and D. Psaltis, J. Appl. Phys. 65, 2191 (1989) which is incorporated by reference herein]) exist in the transmission geometry. With a single grating K recorded by the reference 406-signal 402 wave-vector pair $(k_{R_r}, k_{S_r})$, $k_r = 2\pi/\lambda_r$, all probe-diffracted wave-vector pairs $(k_{R_p}, k_{S_p})$ are Bragg matched when $K = k_{R_p} - k_{S_p}$. The first degeneracy is $(k_{R_p}, k_{S_p})$ at wavelength $\lambda_p = \lambda_r$, obtained by rotation of $(k_{R_p}, k_{S_r})$ about K. In FIG. 4, this degeneracy means the probe source 410 moving along $\Delta y_p$ and the imaging point (resulting on detector 112) along $\Delta y_i = \Delta y_p(f_i/f_p)$, (where $f_i$ is the imaging lens 318). The second degeneracy is for pairs $(k_{R_p}, k_{S_p})$ at wavelenghts $\lambda_p \neq \lambda_r$ (see D. Psaltis, F. Mok, and H. Y.-S. Li, Opt. Lett. 19, 210 (1994), which is incorporated by reference herein). This corresponds to the probe source 410 moving along a spatial-spectral coupled direction in FIG. 4, thereby satisfying:

$$\frac{\Delta x_p}{f_c} = -\frac{\Delta\lambda_p}{\lambda_r}$$

and yielding an image at the output plane with $\Delta z' = (f_i/f_x)\Delta x_p$ relative to the location of the reference image point.

All object (or probe 410) point sources along the two Bragg degenerate dimensions are reconstructed onto the image y'-z'plane. Therefore a 2D slice at a fixed depth in a $y_p$-$(x_p/\lambda_p)$ spatial-spectral coupled plane out of the 4D object space can be extracted by a single volume hologram 108. When the single volume hologram 108 is probed with a monochromatic point source 410 (a 5-µm pinhole under a 488-nm Ar+ laser) along the x-direction at the entrance focal plane, significant diffraction may appear at only one location (the recording pinhole location at 488 nm). In this regard, the image point may disappear due to the shift selectivity.

Figure 6A:
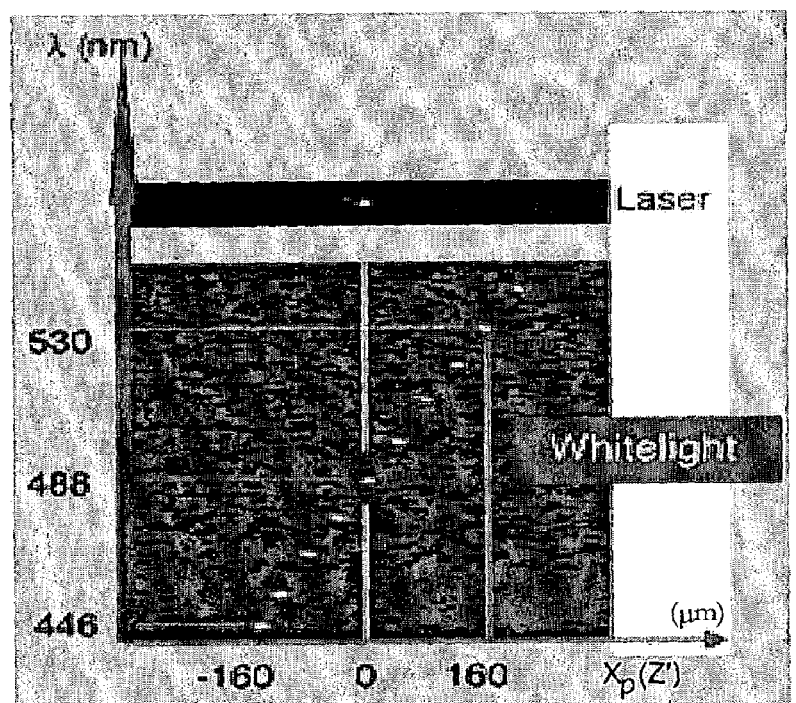
FIGS. 6A and 6B illustrate a quantified/observed experimental demonstration of optical sectioning and imaging in accordance with one or more embodiments of the invention.
Figure 6B:
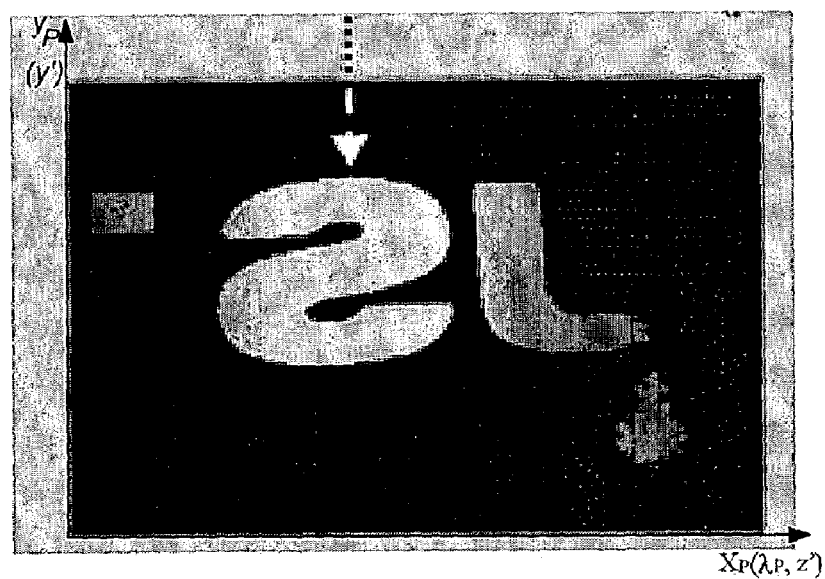

An experimental demonstration of optical sectioning and imaging (i.e., Bragg degeneracies) is quantified/observed in FIGS. 6A and 6B. To produce the images in FIG. 6A and 6B, a 10×, 0.25-N.A. objective lens with a holographic material, LiNbO$_3$ (D=5 mm) was used. FIG. 6A illustrates a response (i.e., a probing of a single volume hologram 108) to a point/probe source object 410 of varying wavelength (i.e., chormatic/white-light) and moving along a lateral x-position. The image point corresponds to the Bragg-matching color components from the probing source 410 as it is moving along the x direction. If a 2D object is placed across the recording point source 404 and illuminated with the same recording wavelength, due to the angle selectivity along the x-direction and the degeneracy along y-direction, the signal from a vertical line across the recording point source 404 will be Bragg matched and projected into a corresponding vertical line image on the detector plane 112. Accordingly, the image point location is shifted along z', while the wavelength changes in accordance with $$\frac{\Delta x_p}{f_c} = -\frac{\Delta \lambda_p}{\lambda_r}.$$

FIG. 6B illustrates a response to a mask (2D object) probe source object 410 illuminated with white light. When the 2D object/mask is illuminated by the polychromatic/while-light source, the single volume hologram 108 generates the 2D object image (i.e., a horizontal-dependent rainbow [spectral] image) illustrated in FIG. 6B with a location dependent color filtering effect.

Multiple 2D sections of a 4D object (e.g., a probe source object 104 of FIG. 1) can be extracted simultaneously if a volume-holographic optical element 108 with multiplexed holograms is used. In this regard, each hologram within the holographic element 108 may be arranged to extract a corresponding slice and to diffract the light from that slice toward a non-overlapping section of the detector 112.

Holographic Imaging of Florescent Microspheres

Figure 7:
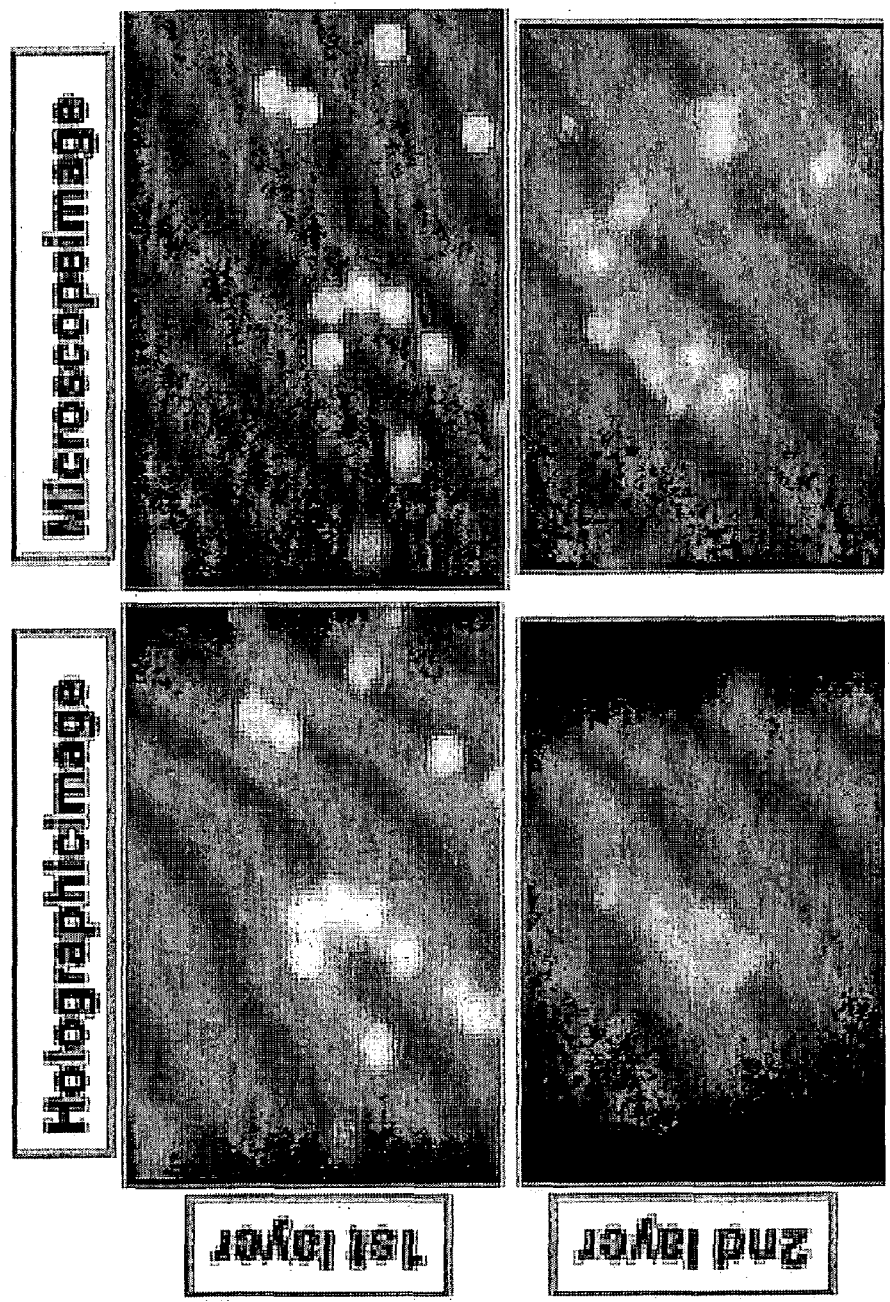
FIG. 7 illustrates images of fluorescent microspheres in accordance with one or more embodiments of the invention.

Holographic imaging may be demonstrated using fluorescent microspheres with a diameter of 15 μm, that are excited by an Ar$^+$ laser at 488 nm. FIG. 7 illustrates images of such fluorescent microspheres (e.g., Molelcular Probes Inc. F-8844 polystrene microsphere, fluorescent yellow-green 505/515 nm, excited by 488 nm), by holographic and normal microscope imaging systems with the collimating 312 and imaging 318 lenses illustrated in FIGS. 3A and 3B. As shown in FIG. 7, a thick sample containing two layers of the microspheres is imaged by the holographic element 108 and the normal microscope structure illustrated in FIG. 3B. The volume holographic imaging system exhibits superior selectivity in both the depth and spectral dimensions compared to the regular microscope. The experimental arrangement with a 2 mm thick polymer and a ×40 objective lens may be capable of $\Delta x=1$ μm, $\Delta z=2\sim5$ μm, and $\Delta\lambda=0.16$ μm. Exact optimization of the trade-offs between magnification, spatial and spectral resolution, and photon efficiency may be accomplished based on the specific imaging application. For example, a thicker volume hologram 108 may be used thereby allowing denser spatial and spectral sampling, but also limiting the photon count at each detector pixel.

As described above, multiplexing holograms into the same holographic imaging component 108 may dramatically increase the optical information processing power. In this regard, multiple 2D sections may be extracted simultaneously from a 4D object 104 with several multiplexed holograms. To provide such processing, each hologram must be arranged to extract a different slice and diffract the light from that slice towards a non-overlapping section of the detector array 112.

Figure 8A:
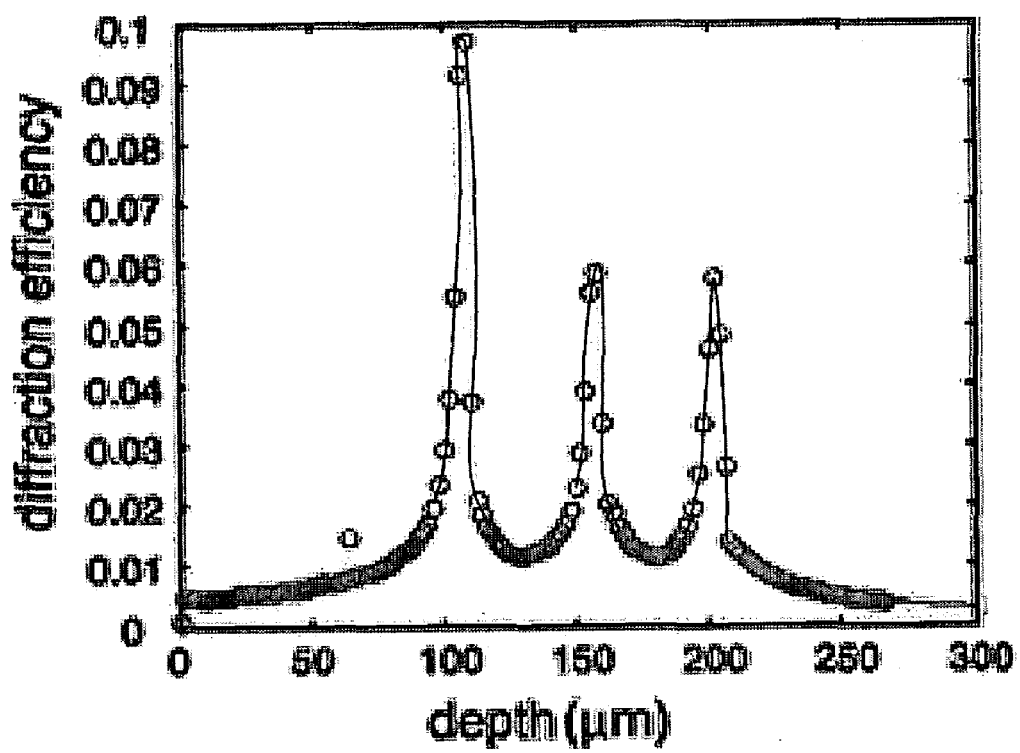
FIGS. 8A and 8B illustrate a single 3D image shot of fluorescent microspheres flowing in water in accordance with one or more embodiments of the invention.
Figure 8B:
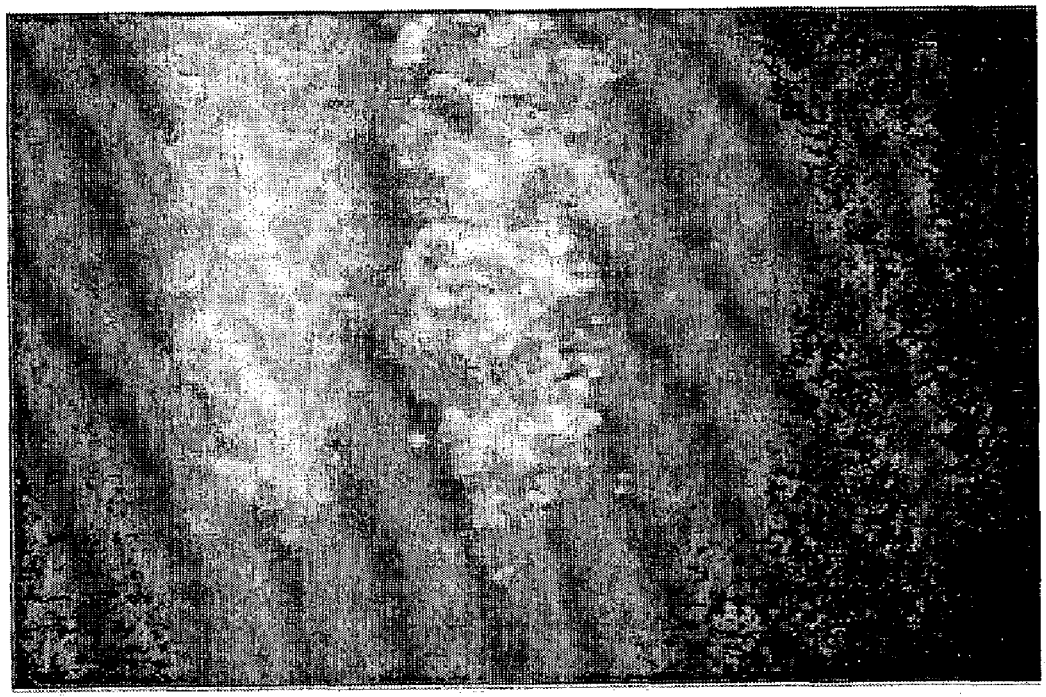

FIGS. 8A and 8B illustrate a single 3D image shot of the fluorescent microspheres flowing in water, acquired in a single measurement by using three holograms to extract three corresponding slices. In other words, FIGS. 8A and 8B illustrate three corresponding slices along the z-direction of a 4D probe source object 104 that were acquired in a single measurement from a liquid sample containing fluorescent microspheres. In this regard, while FIG. 8A illustrates a response to a monochromatic point source object ($\lambda=488$ nm) of varying depth, FIG. 8B illustrates the simultaneous imaging of three slices of an object 104 composed of fluorescent microspheres embedded in water (wherein the microspheres were pumped at 488 nm).

The slices were obtained using three multiplexed holograms arranged within the holographic element 108. The holograms were recorded at 488 nm in the geometry of FIGS. 3A and 3B, with a ×40, NA=0.65 objective lens and holographic material phenanthrequinone (PQ) embedded in PMMA (Polymethylmethacrylate))(thickness 2 mm). Each hologram also has FWHM depth selectivity of 3 μm, lateral resolution of 1 μm and spectral resolution of 0.16 nm.

Each hologram reconstructs a single layer of the microspheres inside the sample. The width of the visible bands is determined by the fluorescence bandwidth in accordance with:

$$\eta(\Delta z_p) = \frac{1}{\alpha}\int_0^\alpha \text{sinc}^2\left(\frac{t}{\Delta\theta_s}\right)dt$$

as described above.

Thus, each slice corresponds to a single holographic optical sectioning in 2D at a depth difference of 50 μm apart in objective space (e.g., in the longitudinal [depth] direction). The width of the visible bands is determined by the fluorescence bandwidth of the microspheres. For an optimal 4D imaging sensor, the number of slices the system can extract may be limited by the number of holograms multiplexed in the same holographic element 108, the holographic diffraction efficiency for each hologram, and the spatial/spectral resolution.

Logical Flow

Figure 9:
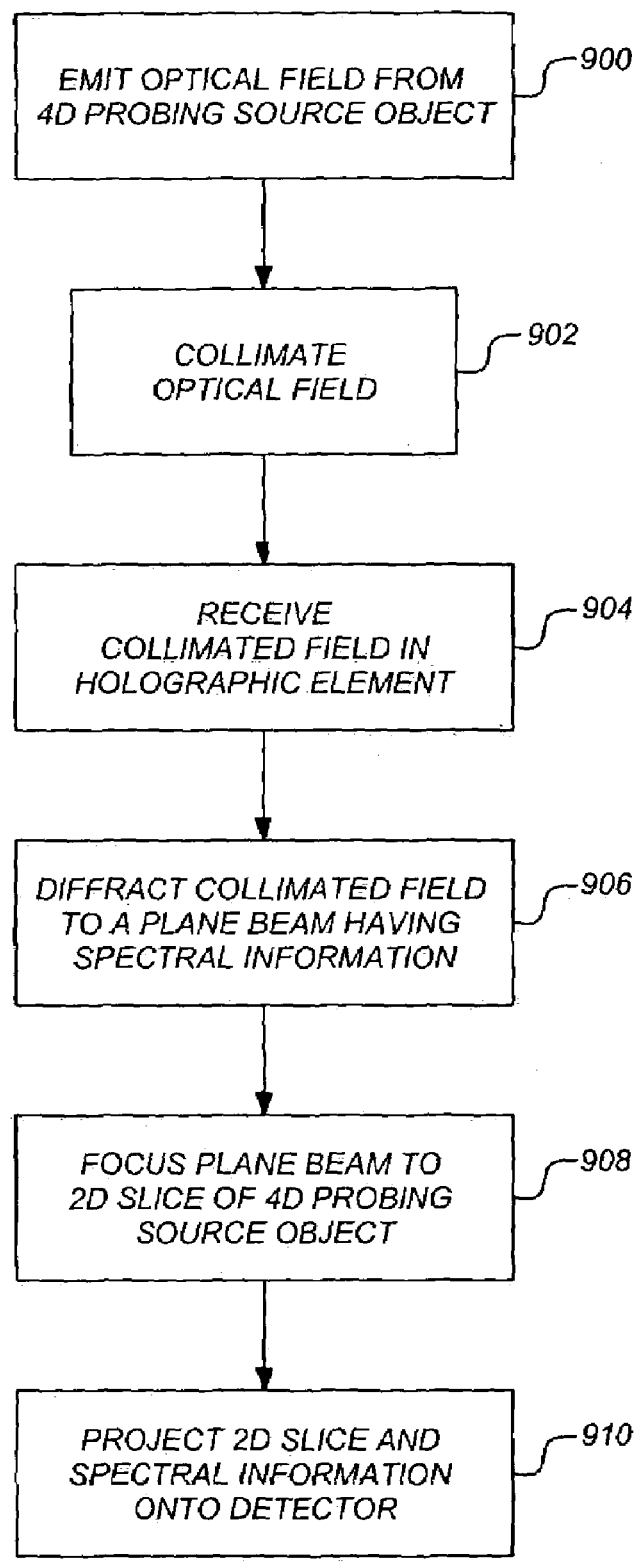
FIG. 9 is a flow chart that illustrates the use of a spectrometer to simultaneously obtain spatial and spectral information in accordance with one or embodiments of the invention.

FIG. 9 is a flow chart that illustrates the use of a spectrometer (illustrated in FIGS. 1 and 4) to simultaneously obtain spatial and spectral information in accordance with one or more embodiments of the invention. In this regard, the invention takes advantage of the Bragg diffraction selectivity and degeneracy properties of volume holograms 108.

At step 900, an optical field 102 is emitted from a 4D probing source object 104. At step 902, objective optics 106 (e.g., a collimating lens 312) processes the optical field 102 (e.g., by collimating the optical field 102). However, it should be noted that the objective optics 106 may be part of, integrated with, or within the holographic element 108.

At step 904, the optical field is received in a volume holographic element 108. As described above, the volume holographic element 108 is recorded with one or multiple holograms by the interference of either a point source signal beam (monochromatic or chromatic) 402 and a plane reference beam 406, or any other pre-designed or computer generated signal and reference wavefronts. In one or more embodiments, multiple holograms may be multiplexed in the volume holographic element 108.

At step 906, based on one or more Bragg degeneracy properties, the volume holographic element 108 diffracts the optical field into one or more diffracted plane beams (i.e., spatial information) having spectral information. Collector optics 110 (e.g., comprising imaging lens 318) may then be used to focus the one or more diffracted plane beams having spectral information to a two-dimensional (2D) slice (having spectral information) of the 4D probing source object 104 at step 908. However, it should be noted that the collector optics 110 may be part of, integrated with, or within the holographic element 108.

The resulting 2D slice and spectral information is projected onto a detector 112 (e.g., a CCD) at step 910. In addition, if multiple holograms are multiplexed within the volume holographic element 108, the holograms may be arranged to extract a corresponding slice of the 4D probing source object 104 and diffract light from the corresponding slice to a non-overlapping section of the detector 112.

CONCLUSION

This concludes the description of the preferred embodiment of the invention. The following describes some alternative embodiments for accomplishing the present invention. For example, alternative types of 4D object (e.g., a polychromatic incoherent object), objective optics, collimating lens, collector optics, imaging lens, holographic volume/elemental material/compound, and detector could be used consistently and within the scope of the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A holographic imaging spectrometer comprising:
  (a) a four-dimensional (4D) probing source object;
  (b) a holographic element comprising one or more recorded holograms configured to receive and diffract an optical field emitted from the 4D probing source object into one or more diffracted plane beams having spectral information;
  (c) collector optics configured to:
    (i) focus the one or more diffracted plane beams having spectral information to a two-dimensional (2D) slice having spectral information of the 4D probing source object; and
    (ii) project the focused 2D slice having spectral information onto a detector; and
  (d) the detector configured to receive the focused and projected 2D slice.

2. The spectrometer of claim 1, wherein one of the recorded holograms was recorded by interfering a monochromatic point source signal beam and a plane reference beam.

3. The spectrometer of claim 1, wherein one of the recorded holograms was recorded by a pre-designed or computer generated signal and a reference wavefront.

4. The spectrometer of claim 1, wherein:
  the one or more recorded holograms are multiplexed within the holographic element;
  the one or more recorded holograms are arranged to extract a corresponding slice of the 4D probing source object; and
  the one or more recorded holograms are arranged to diffract light from the corresponding slice of the 4D probing source object to a non-overlapping section of the detector.

5. The spectrometer of claim 1, further comprising objective optics configured to process the optical field emitted from the 4D probing source object.

6. The spectrometer of claim 5, wherein the objective optics comprises a collimating lens configured to collimate the optical field.

7. The spectrometer of claim 5, wherein the objective optics is part of the holographic element.

8. The spectrometer of claim 1, wherein the diffraction by the one or more holograms is based on one or more Bragg degeneracy properties.

9. The spectrometer of claim 1, wherein the collector optics is part of the holographic element.

10. The spectrometer of claim 1, wherein the collector optics comprises an imaging lens.

11. A method for imaging a four-dimensional object comprising:
  emitting an optical field from a four-dimensional (4D) probing source object;
  receiving the emitted optical field in a holographic element
  diffracting the received optical field in the holographic element to one or more diffracted plane beams having spectral information;
  focusing the one or more diffracted plane beams having spectral information to a two-dimensional (2D) slice (having spectral information) of the 4D probing source object; and
  projecting the focused 2D slice having spectral information onto a detector.

12. The method of claim 11, wherein one of the recorded holograms was recorded by interfering a monochromatic point source signal beam and a plane reference beam.

13. The method of claim 11, wherein one of the recorded holograms was recorded by a pre-designed or computer generated signal and a reference wavefront.

14. The method of claim 11, wherein:
  the one or more recorded holograms are multiplexed within the holographic element;
  the one or more recorded holograms are arranged to extract a corresponding slice of the 4D probing source object; and
  the one or more recorded holograms are arranged to diffract light from the corresponding slice of the 4D probing source object to a non-overlapping section of the detector.

15. The method of claim 11, further comprising the step of processing the emitted optical field through objective optics.

16. The method of claim 15, wherein the objective optics comprises a collimating lens configured to collimate the emitted optical field.

17. The method of claim 15, wherein the objective optics is part of the holographic element.

18. The method of claim 11, wherein the diffraction by the one or more holograms is based on one or more Bragg degeneracy properties.

19. The method of claim 11, wherein the focusing step is performed within the holographic element.

20. The method of claim 11, wherein the focusing step is performed using an imaging lens.

21. An apparatus for imaging a four-dimensional object comprising:
  means for emitting an optical field from a four-dimensional (4D) probing source object;
  means for a holographic element to receive and diffract the optical field into one or more diffracted plane beams having spectral information;
  means for focusing the one or more diffracted plane beams having spectral information to a two-dimensional (2D) slice (having spectral information) of the 4D probing source object; and
  means for projecting the focused 2D slice having spectral information onto a detector.

22. The apparatus of claim 21, wherein one of the recorded holograms was recorded by interfering a monochromatic point source signal beam and a plane reference beam.

23. The apparatus of claim 21, wherein one of the recorded holograms was recorded by a pre-designed or computer generated signal and a reference wavefront.

24. The apparatus of claim 21, wherein:
the one or more recorded holograms are multiplexed within the holographic element;
the one or more recorded holograms are arranged to extract a corresponding slice of the 4D probing source object; and
the one or more recorded holograms are arranged to diffract light from the corresponding slice of the 4D probing source object to a non-overlapping section of the detector.

25. The apparatus of claim 21, further comprising means for processing the emitted optical field.

26. The apparatus of claim 25, wherein the means for processing comprises means for collimating the optical field.

27. The apparatus of claim 25, wherein the means for processing is part of the holographic element.

28. The apparatus of damn 21, wherein the diffraction by the one or more holograms is based on one or more Bragg degeneracy properties.

29. The apparatus of claim 21, wherein the means for focusing are part of the holographic element.

30. The apparatus of claim 21, wherein the means for focusing comprises an imaging lens.

* * * * *

UNITED STATES PATENT AND TRADEMARK OFFICE
CERTIFICATE OF CORRECTION

| | |
|---|---|
| PATENT NO. | : 7,158,228 B2 |
| APPLICATION NO. | : 10/627184 |
| DATED | : January 2, 2007 |
| INVENTOR(S) | : Psaltis et al. |

It is certified that error appears in the above-identified patent and that said Letters Patent is hereby corrected as shown below:

<u>Column 14</u>:

Claim 28, line 6, please delete "damn" and insert --claim--.

Signed and Sealed this

Twenty-sixth Day of October, 2010

David J. Kappos
*Director of the United States Patent and Trademark Office*